(12) United States Patent
Yoshida

(10) Patent No.: US 7,861,136 B2
(45) Date of Patent: *Dec. 28, 2010

(54) ERROR CORRECTING APPARATUS AND ERROR CORRECTING METHOD

(75) Inventor: Kenji Yoshida, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 251 days.

This patent is subject to a terminal disclaimer.

(21) Appl. No.: 12/146,107

(22) Filed: Jun. 25, 2008

(65) Prior Publication Data

US 2009/0006922 A1    Jan. 1, 2009

(30) Foreign Application Priority Data

Jun. 29, 2007    (JP) .............................. 2007-173474

(51) Int. Cl.
*H03M 13/00* (2006.01)

(52) U.S. Cl. ....................... 714/758; 714/800

(58) Field of Classification Search ................. 714/758, 714/800
See application file for complete search history.

(56) References Cited

U.S. PATENT DOCUMENTS

| | | | | |
|---|---|---|---|---|
| 5,289,501 A | * | 2/1994 | Seshadri et al. | 375/286 |
| 5,388,105 A | * | 2/1995 | Takagi et al. | 714/758 |
| 5,471,486 A | * | 11/1995 | Baggen et al. | 714/782 |
| 5,872,798 A | * | 2/1999 | Baggen et al. | 714/755 |
| 6,079,041 A | * | 6/2000 | Kunisa et al. | 714/752 |
| 6,141,787 A | * | 10/2000 | Kunisa et al. | 714/769 |
| 6,144,324 A | * | 11/2000 | Sasaki | 341/94 |
| 6,163,514 A | * | 12/2000 | Narumi et al. | 369/47.15 |
| 6,199,190 B1 | * | 3/2001 | Wan | 714/786 |
| 6,445,313 B2 | * | 9/2002 | Ahn | 341/59 |
| 7,414,955 B2 | * | 8/2008 | Iwanaga | 369/275.3 |
| 2003/0031102 A1 | * | 2/2003 | Narumi et al. | 369/47.3 |

FOREIGN PATENT DOCUMENTS

| | | |
|---|---|---|
| JP | 09-252253 | 9/1997 |
| JP | 11-007736 | 1/1999 |
| JP | 2004-282753 | 10/2004 |
| JP | 2007-141341 | 6/2007 |

* cited by examiner

*Primary Examiner*—M. Mujtaba K Chaudry
(74) *Attorney, Agent, or Firm*—Pillsbury Winthrop Shaw Pittman, LLP

(57) ABSTRACT

According to one embodiment, an error correction parity bit sequence is generated for a data sequence obtained by adding a dummy symbol of a specific pattern to a digital information sequence modulated to convert into a form satisfying the request of a reproducing system. If the parity bit sequence meets the request of the reproducing system, the modulated digital information sequence excluding the dummy symbol and the parity bit sequence are output in such a manner that the information sequence and parity bit sequence correspond to each other. If the parity bit sequence does not meet the request of the reproducing system, a dummy symbol of another pattern is added to the modulated digital information sequence, thereby generating an error correction parity bit sequence.

11 Claims, 7 Drawing Sheets

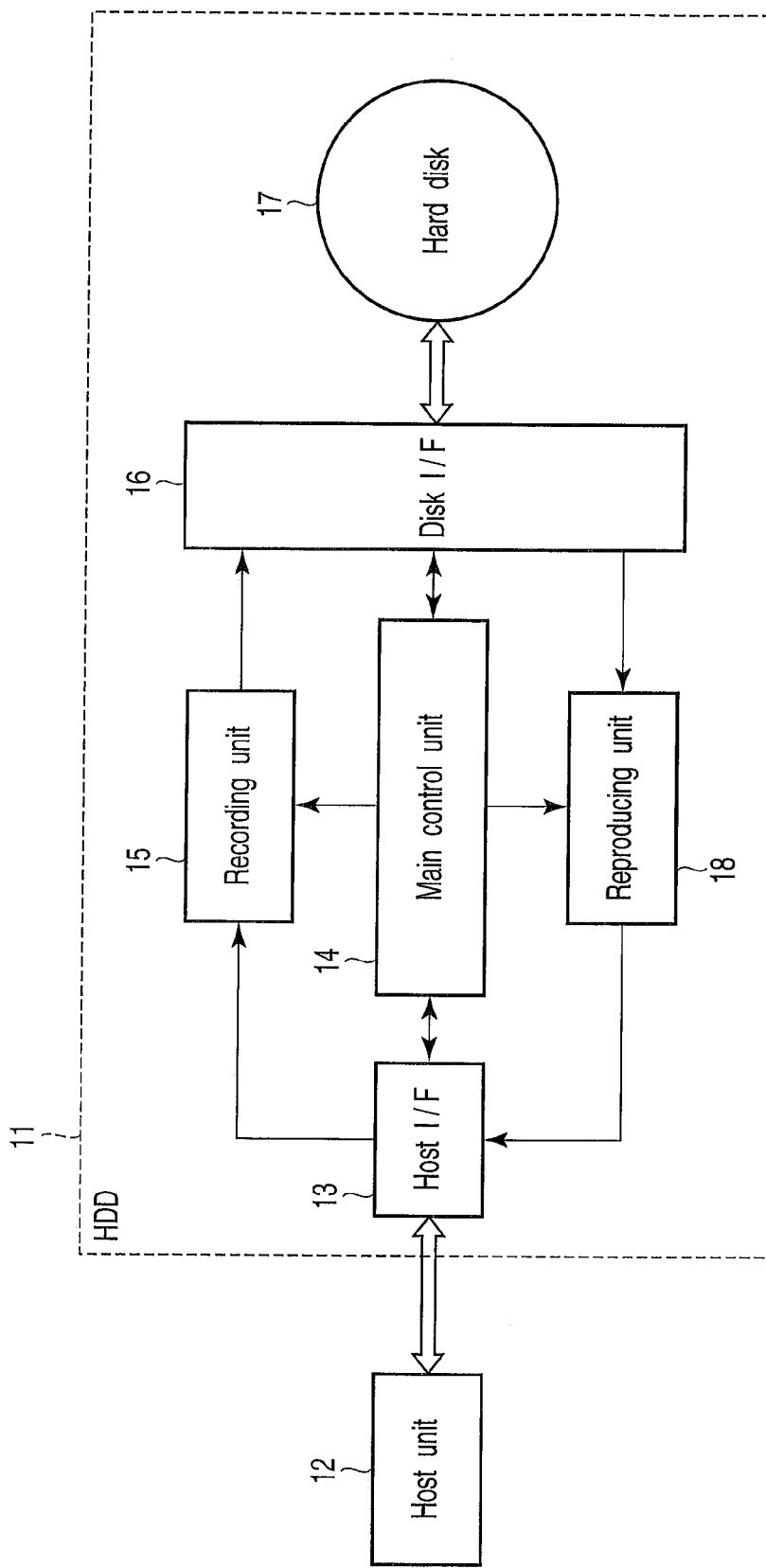
F I G. 1

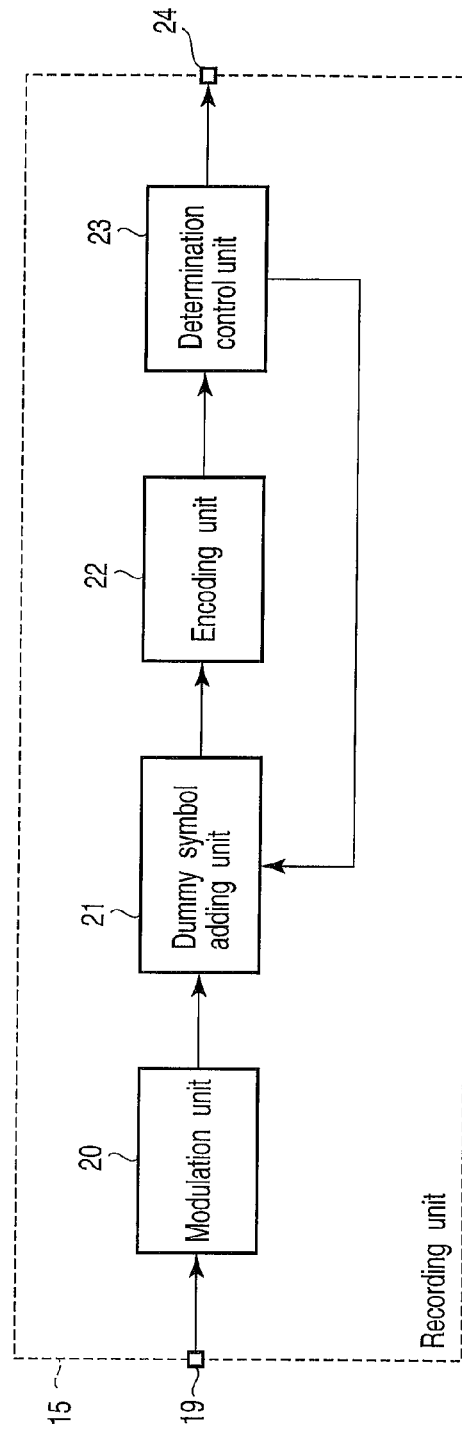
F I G. 3
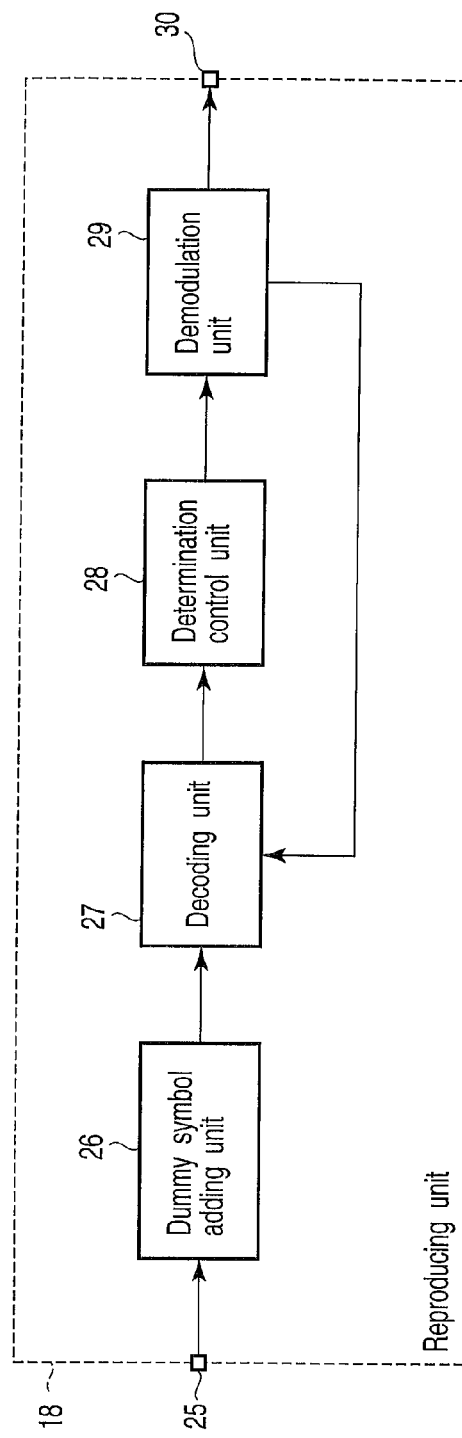
F I G. 7

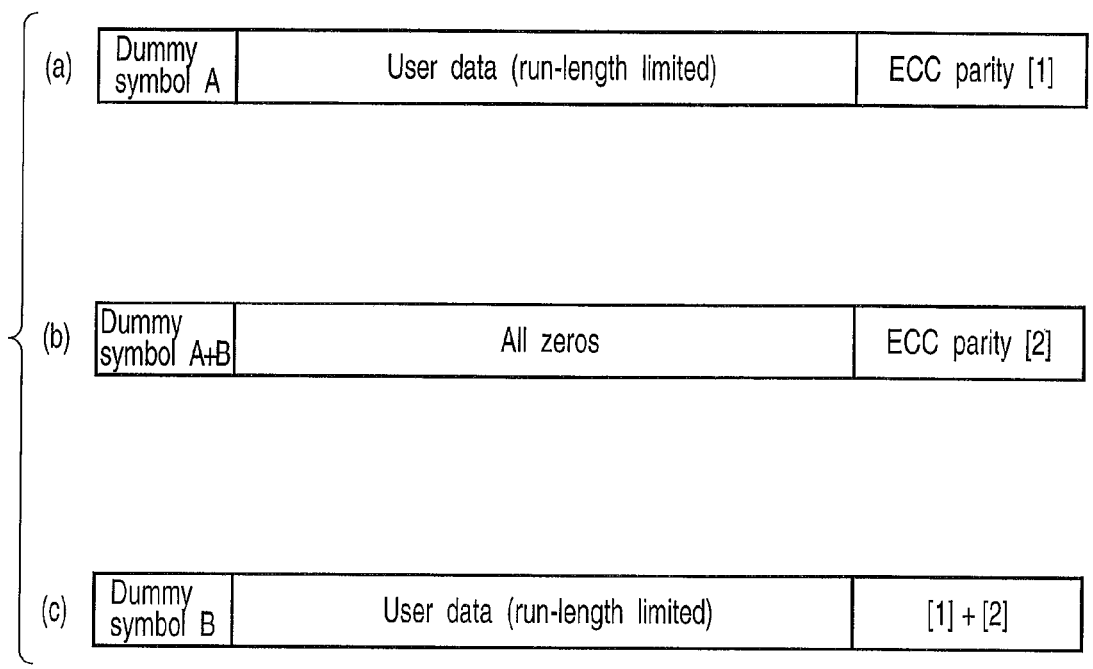
F I G. 5

ERROR CORRECTING APPARATUS AND ERROR CORRECTING METHOD

CROSS-REFERENCE TO RELATED APPLICATIONS

This application is based upon and claims the benefit of priority from prior Japanese Patent Application No. 2007-173474, filed Jun. 29, 2007, the entire contents of which are incorporated herein by reference.

BACKGROUND

1. Field

One embodiment of the invention relates to the improvement of an error correcting apparatus and an error correcting method which subject a digital information sequence to an error correction encoding process.

2. Description of the Related Art

As is commonly known, in a system which records and reproduces digital information sequences corresponding to, for example, pictures and sounds onto and from an information recording medium, such as a disk or tape, ECC (error correcting code) parity is added to a digital information sequence to be recorded and then a modulation process for satisfying the request of the recording and reproducing system, such as the process of preventing zeros from running for more than a specific length is carried out.

In recent years, an encoding means (sometime referred to as reverse ECC) has been developed which subjects a digital information sequence to be recorded to a first modulation process for satisfying the request of the recording and reproducing system and then subjects the added ECC parity to a second modulation process for satisfying the request of the recording and reproducing system.

However, since such an encoding means has to subject the original digital information sequence to the first modulation process and then its ECC parity to the second modulation process, that is, it has to perform two modulation processes, it has at a disadvantage in that the configuration is complicated and the number of bits in the data to be recorded increases.

Jpn. Pat. Appln. KOKAI Publication No. 2007-141341 has disclosed a method of adding a dummy bit to a digital information sequence modulated to meet the request of the recording and reproducing system, thereby generating an error correction parity bit sequence, and when the generated parity bit sequence cannot satisfy the request of the recording and reproducing system, changing the value of the dummy bit to generate a new parity bit sequence, and replacing the old sequence with the new one.

Furthermore, Jpn. Pat. Appln. KOKOKU Publication No. 3167638 has disclosed a method of, when RS (Reed-Solomon) code is used as error correction code, multiplying by a member in a Galois field instead of converting data on the basis of a modulation table, thereby giving an error correcting capability similar to the original data to the multiplication Galois field information even if the modulation circuit has only one error correction circuit.

In addition, Jpn. Pat. Appln. KOKOKU Publication No. 3827678 has disclosed a method of inserting a synchronizing code word including multiplexing information into data streams multiplexed with multiplexing information and modulating the resulting streams and selecting the one with the smallest DC component among the modulated data streams.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is a block diagram to help describe an outline of an HDD according to an embodiment of the invention;

FIG. 3 is a block diagram to help explain an example of a recording unit incorporated in the HDD of the embodiment;

FIG. 5 is a diagram to help give a concrete description of means for simplifying the processing operation at the recording unit incorporated in the HDD of the embodiment;

FIG. 7 is a block diagram to help explain an example of the reproducing unit incorporated in the HDD of the embodiment.

DETAILED DESCRIPTION

Figure 2:
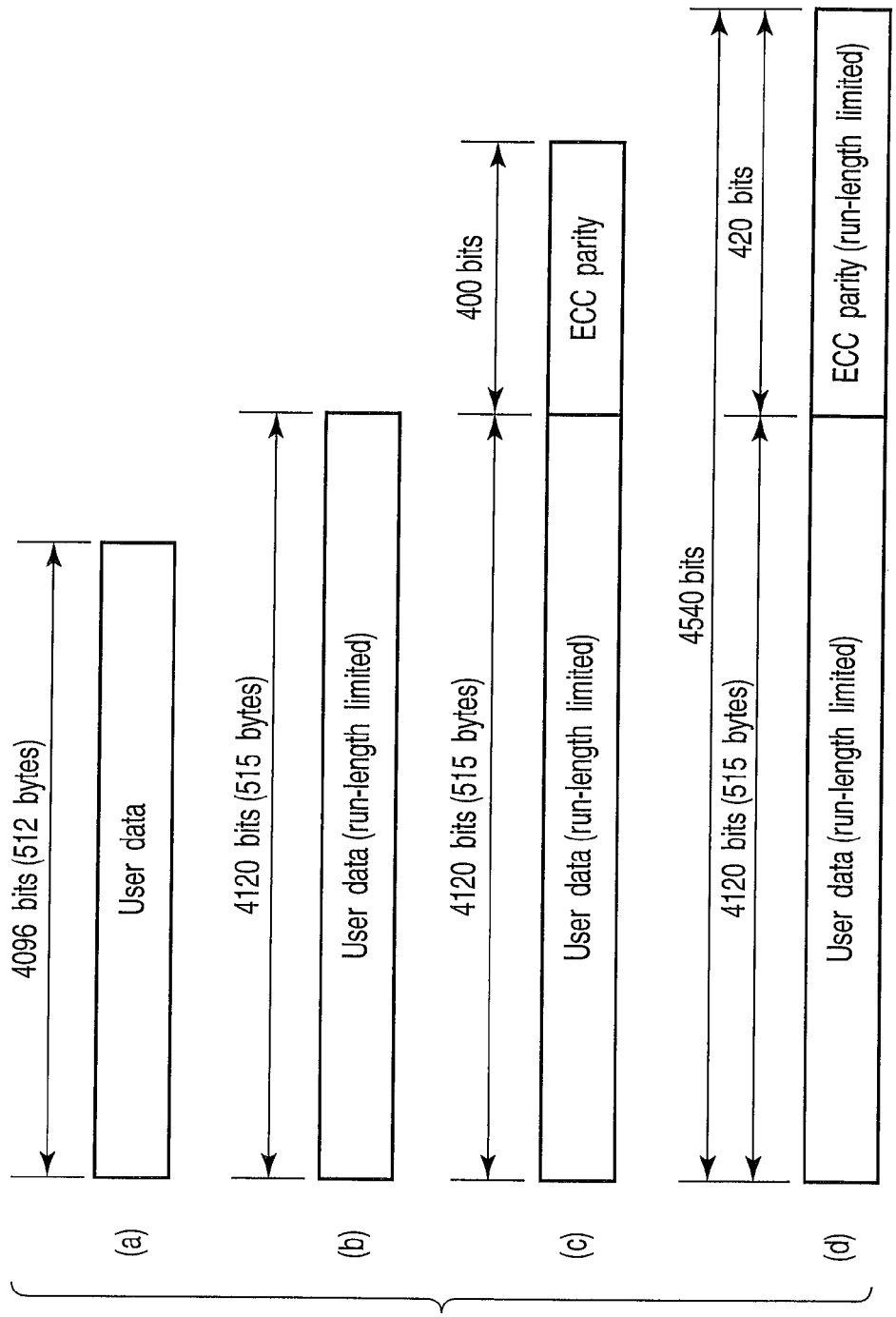
FIG. 2 is a diagram to help give a concrete description of a now-commonly-performed coding method using reverse ECC.

Various embodiments according to the invention will be described hereinafter with reference to the accompanying drawings. In general, according to one embodiment of the invention, an error correction parity bit sequence is generated for a data sequence obtained by adding a dummy symbol of a specific pattern to a digital information sequence modulated to convert into a form satisfying the request of a reproducing system. If the parity bit sequence meets the request of the reproducing system, the modulated digital information sequence excluding the dummy symbol and the parity bit sequence are output in such a manner that the information sequence and parity bit sequence correspond to each other. If the parity bit sequence does not meet the request of the reproducing system, a dummy symbol of another pattern is added to the modulated digital information sequence, thereby generating a new error correction parity bit sequence.

Hereinafter, referring to the accompanying drawings, an embodiment of the invention will be explained in detail. FIG. 1 schematically shows an HDD (hard disk drive) 11 serving as an information recording and reproducing apparatus to be explained in the embodiment. The HDD 11 includes a host I/F (interface) 13 for exchanging information with an external host unit 12.

The host unit 12 is, for example, a PC (personal computer). When executing, for example, a specific application software program, the host unit 12 can not only write and read information using the HDD 11 but also use the HDD 11 as a destination to save the finally obtained information.

In this case, the host unit 12 generates commands to request the HDD 11 to write and read information. These commands are supplied via the host I/F 13 to a main control unit 14, which analyzes the commands. The main control unit 14, which includes a CPU (central processing unit), performs overall control of various operations carried out by the HDD 11.

For example, when the host unit 12 gives a write request command, the write request command is supplied via the host I/F 13 to the main control unit 14, which analyzes the command. As a result, the main control unit 14 not only drives a recording unit 15 but also brings a hard disk 17 into a writing state via a disk I/F 16.

Furthermore, a digital information sequence to be written is supplied via the host I/F 13 to the recording unit 15. The recording unit 15 subjects the input digital information sequence to a modulation process in a form satisfying the request of the recording and reproducing system of the HDD 11, such as a run length modulation process, (e.g., a modulation process of preventing zeros from running for more than a specific length) and then calculates an ECC parity bit sequence on the basis of, for example, RS code and adds the ECC parity bit sequence to the information sequence.

Then, the recording unit 15 writes the digital information sequence subjected to the necessary processes for recording onto the hard disk 17 via the disk I/F 16. Here, on the basis of the write request from the host unit 12, the recording unit 15 has written the digital information sequence onto the hard disk 17.

On the other hand, when the host unit 12 gives a read request command, the read request command is supplied via the host I/F 13 to the main control unit 14, which analyzes the command. As a result, the main control unit 14 not only drives a reproducing unit 18 but also brings the hard disk 17 into a reading state via the disk I/F 16.

Furthermore, a digital information sequence read from the hard disk 17 is supplied via the disk I/F 16 to the reproducing unit 18. The reproducing unit 18 subjects the input digital information sequence to an error correction process corresponding to the ECC parity bit sequence added to the input sequence and then further subjects the corrected sequence to a demodulation process for such modulation as run length modulation, thereby restoring the original digital information sequence.

Then, the reproducing unit 18 outputs the digital information sequence subjected to the necessary processes for reproduction to the host unit 12 via the host I/F 13. Here, on the basis of the read request from the host unit 12, the reproducing unit 18 has read the digital information sequence from the hard disk 17.

Before the explanation of the main part of the embodiment, a now-commonly-performed method using the aforementioned reverse ECC will be explained briefly. In the reverse ECC, first, a digital information sequence to be recorded into an information recording medium is subjected to a first modulation process, such as a run length modulation process, (e.g., a run length limited process of preventing zeros from running for more than a specific length) to convert the information sequence into a form satisfying the request of the recording and reproducing system.

Thereafter, an error correction ECC parity bit sequence is generated for the digital information sequence subjected to the first modulation process. The generated ECC parity bit sequence is subjected to a second modulation process to convert the parity bit sequence into a form satisfying the request of the recording and reproducing system. Then, the digital information sequence subjected to the first modulation process and the ECC parity bit sequence subjected to the second modulation process are recorded in such a manner that they correspond to each other.

Specifically, suppose 4096 bits of user data as a digital information sequence to be written into an information recording medium as shown by reference symbol (a). If 1 byte contains 8 bits, the digital information sequence contains 512 bytes. If 1 symbol contains 10 bits, the digital information sequence contains 410 symbols.

When a 4096-bit digital information sequence shown by reference symbol (a) of FIG. 2 is subjected to the first modulation process to convert the sequence into a form satisfying the request of the recording and reproducing system, such as a run length modulation process, (e.g., a run length limited process of preventing zeros from running for more than a specific length), the amount of data increases to 4120 bits (515 bytes) as shown by reference symbol (b) of FIG. 2.

Thereafter, for the 4120-bit digital information sequence subjected to the first modulation process shown by reference symbol (b) of FIG. 2, an error correction ECC parity bit sequence is generated as shown by reference symbol (c) of FIG. 2. In this case, if the generated ECC parity bit sequence contains 400 bits, when the 400-bit ECC parity bit sequence is subjected to the second modulation process to convert the sequence into a form satisfying the request of the recording and reproducing system, the amount of data increases to 420 bits as shown by reference symbol (d) of FIG. 2.

Specifically, with a common encoding method using reverse ECC, when a 4096-bit digital information sequence shown by reference symbol (a) of FIG. 2 is recorded into an information recording medium, the first and second modulation processes, that is, two modulation processes, are needed, making the processing complicated. Moreover, since 4540 bits of data obtained by summing the 4120-bit digital information sequence subjected to the first modulation process and the 420-bit ECC parity bit sequence subjected to the second modulation process has to be recorded, the length of data to be recorded becomes longer.

To overcome this problem, the embodiment uses a configuration and a method described below to decrease the number of processes of converting into a form satisfying the request of the recording and reproducing system to only one and further to shorten the length of data to be recorded.

FIG. 3 shows an example of the recording unit 15. First, when information is recorded, the digital information sequence (user data) supplied via the host I/F 13 from the host unit 12 is supplied via an input terminal 19 to the modulation unit 20. Suppose the digital information sequence input to the modulation unit 20 contains 4096 bits (=512 bytes) as shown by reference symbol (a) of FIG. 4.

The modulation unit 20 subjects the input digital information sequence to a modulation process whose form satisfies the request of the recording and reproducing system of the HDD11, such as a run length coding process, (e.g., a run length limited process of preventing zeros from running for more than a specific length). The run-length limited digital information sequence contains 4120 bits (515 bytes) as shown by reference symbol (b) of FIG. 4.

Then, the run-length limited digital information sequence at the modulation unit 20 is supplied to a dummy symbol adding unit 21. The dummy symbol adding unit 21 adds, for example, a 1-symbol (=10-bit) dummy symbol to the head of the input run-length limited digital information sequence as shown by reference symbol (c) of FIG. 4. In this case, as the dummy symbol, a plurality of patterns A, B, C, . . . have been prepared. At first, the order is set in advance so that the dummy symbol of pattern A may be added as shown by reference symbol (c) of FIG. 4.

Thereafter, the digital information sequence to which the dummy symbol of pattern A has been added by the dummy symbol adding unit 21 is supplied to an encoding unit 22. The encoding unit 22 calculates a 400-bit ECC parity bit sequence on the basis of, for example, the RS code for the input digital information sequence including the dummy symbol of pattern A as shown by reference symbol (d) of FIG. 4 and adds the parity bit sequence to the information sequence.

Figure 4:
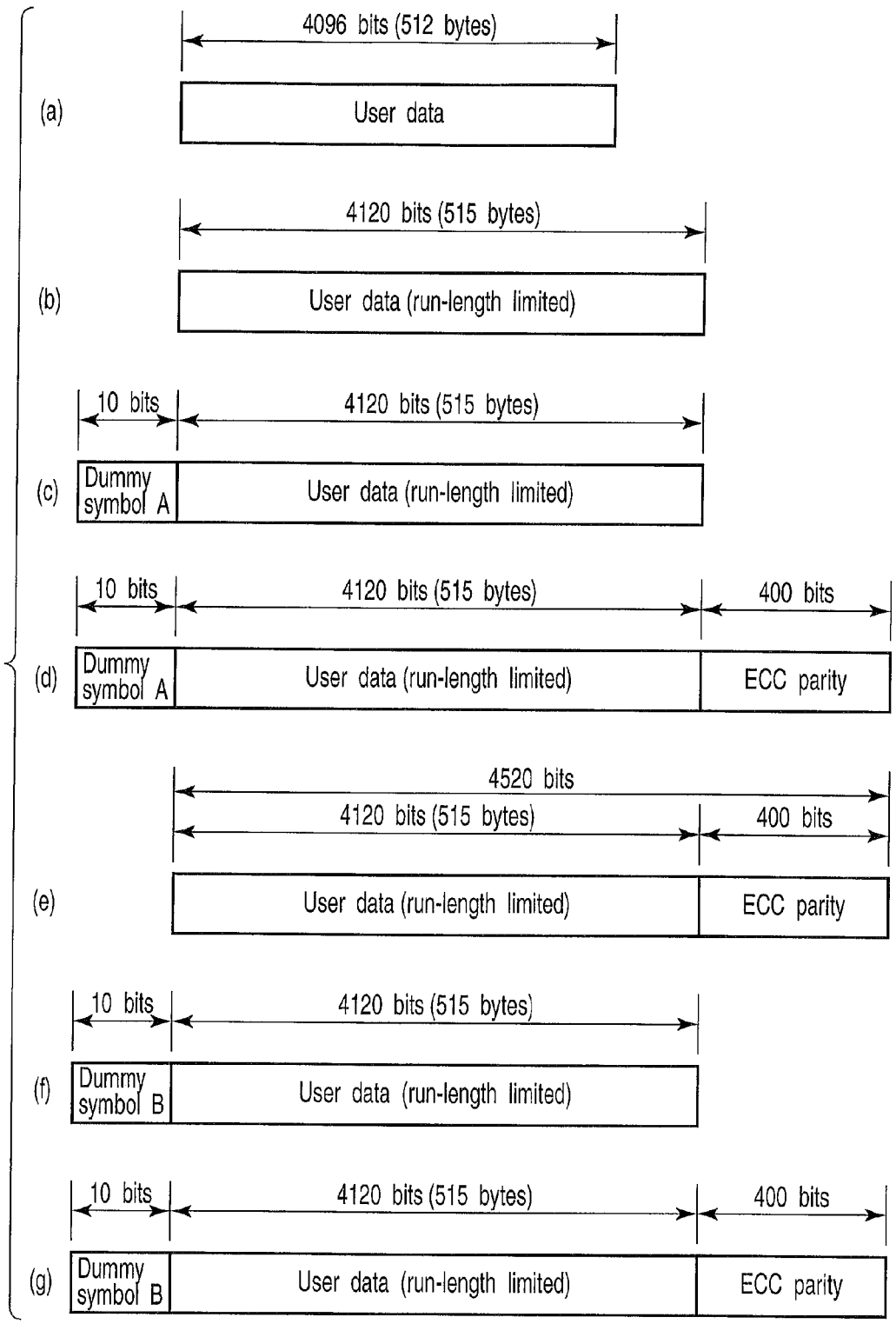
FIG. 4 is a diagram to help give a concrete description of the processing operation at the recording unit incorporated in the HDD of the embodiment.

The position where the dummy symbol is added to the run-length limited digital information sequence is not limited to the head of the digital information sequence. For instance, the dummy symbol may be added to the middle or end of the digital information sequence as shown by reference symbol (c) of FIG. 4, provided that the position where the symbol is to be added is determined beforehand and can be found at the time of decoding explained later.

More specifically, when the dummy symbol of pattern A to be added first is set to all zeros, it can be considered that the dummy symbol is the part whose degree is equal to or higher than the highest degree of the digital information sequence (user data), an ECC code word, or that the dummy symbol has already been added to a specific symbol in the digital information sequence in such a manner that the dummy symbol has been exclusive ORed with the specific symbol.

Therefore, if the first dummy symbol of pattern A is all zeros, the dummy symbol adding unit 21 may not carry out a dummy symbol adding process and then the encoding unit 22 may calculate an ECC parity bit sequence on the assumption that a dummy symbol of all zeros has been added as described above.

However, even when the dummy symbol of pattern A to be added first is set to all zeros, if the digital information sequence is divided in two and the dummy symbol is caused to intervene between them or if the dummy symbol is added to the end of the digital information sequence, the dummy symbol adding unit 21 has to carry out a dummy symbol adding process.

Then, the data sequence (the dummy symbol of pattern A+the run-length limited digital information sequence+the ECC parity bit sequence) output from the encoding unit 22 is supplied to a determination control unit 23. The determination control unit 23 determines whether or not the ECC parity bit sequence included in the input data sequence is in a state satisfying the request of the recording and reproducing system of the HDD 11, such as a state where zeros do not run for more than a specific length.

Then, if having determined that the ECC parity bit sequence is in a form satisfying the request of the recording and reproducing system of the HDD 11, the determination control unit 23 outputs the data sequence supplied from the encoding unit 22 excluding the dummy symbol, that is, the run-length limited digital information sequence+the ECC parity bit sequence, at an output terminal 24 as shown by reference symbol (e) of FIG. 4. The output data sequence is recorded onto the hard disk 17.

If having determined that the ECC parity bit sequence is not in a form satisfying the request of the recording and reproducing system of the HDD 11, the determination control unit 23 requests the dummy symbol adding unit 21 to change the pattern of the dummy symbol. As a result, the dummy symbol adding unit 21 adds the dummy symbol of pattern B corresponding to the next order to the head of the previously input run-length limited digital information sequence as shown by reference symbol (f) of FIG. 4.

Thereafter, the digital information sequence to which the dummy symbol of pattern B has been added by the dummy symbol adding unit 21 is supplied to the encoding unit 22. The encoding unit 22 calculates a 400-bit ECC parity bit sequence on the basis of, for example, the RS code for the input digital information sequence including the dummy symbol of pattern B and adds the parity bit sequence to the information sequence as shown by reference symbol (g) of FIG. 4.

Then, the data sequence (the dummy symbol of pattern B+the run-length limited digital information sequence+the ECC parity bit sequence) output from the encoding unit 22 is supplied to the determination control unit 23. The determination control unit 23 determines whether or not the ECC parity bit sequence included in the input data sequence is in a state satisfying the request of the recording and reproducing system of the HDD 11, such as a state where zeros do not run for more than a specific length.

Then, if having determined that the ECC parity bit sequence is in a form satisfying the request of the recording and reproducing system of the HDD 11, the determination control unit 23 outputs the data sequence supplied from the encoding unit 22 excluding the dummy symbol, that is, the run-length limited digital information sequence+the ECC parity bit sequence, at the output terminal 24. The output data sequence is then recorded onto the hard disk 17.

If having determined that the ECC parity bit sequence is not in a form satisfying the request of the recording and reproducing system of the HDD 11, the determination control unit 23 requests the dummy symbol adding unit 21 to change the pattern of the dummy symbol. As a result, the dummy symbol adding unit 21 adds the dummy symbol of pattern C corresponding to the next order to the head of the input run-length limited digital information sequence. From this point on, the determination control unit 23 repeats a similar operation, while changing the pattern of the dummy symbol, until it determines that the ECC parity bit sequence goes into a form satisfying the request of the recording and reproducing system of the HDD 11.

The recording unit 15 subjects the 4096-bit digital information sequence (user data) supplied from the host unit 12 to a modulation process in a form satisfying the request of the recording and reproducing system of the HDD 11, such as a run length coding process, (e.g., a run length limited process of preventing zeros from running for more than a specific length) and does not subject the ECC parity bit sequence to a modulation process for run length limitation, which facilitates the modulation process.

Since the 4520-bit data sequence composed of the 4120-bit run-length limited digital information sequences excluding the dummy symbol and the 400-bit ECC parity bit sequence not subjected to a run length limited process is recorded onto the hard disk 17, the length of data recorded can be decreased by 20 bits as compared with that of the 4540-bit data shown by reference symbol (d) of FIG. 2.

The probability that the ECC parity bit sequence calculated by the encoding unit 20 for the dummy symbol of the first pattern A+the run-length limited digital information sequence is not in a form satisfying the request of the recording and reproducing system of the HDD 11 is practically very low (0.02%).

Therefore, there is a very low probability (0.0004%) that the ECC parity bit sequence newly calculated by the determination control unit 23 for the dummy symbol of the next pattern B+the run-length limited digital information sequence is also not in a form satisfying the request of the recording and reproducing system of the HDD 11, when the ECC parity bit sequence calculated for the dummy symbol of the first pattern A+the run-length limited digital information sequence is not in a form satisfying the request of the recording and reproducing system of the HDD 11.

That is, from a realistic point of view, it is in any case unlikely that the process of changing the pattern of the dummy symbol, calculating an ECC parity bit sequence, and determining whether or not the ECC parity bit sequence is in a form satisfying the request of the recording and reproducing system will be repeated three times or more. In this respect, the processes can be simplified.

Furthermore, the data length of the ECC parity bit sequence is increased by the value by which the length of data to be recorded has decreased, which enables the ECC correcting capability to be improved without varying the recording density in a write operation. For example, suppose a 1-bit correcting capability is given each time the ECC parity bit sequence increases by 10 bits. As shown by reference symbol (e) of FIG. 4, if the length of data to be recorded can be decreased by 20 bits as compared with the 4540-bit data shown by reference symbol (d) of FIG. 2, increasing the ECC parity bit sequence by 20 bits enables the error correcting capability to be increased by 2 bits with the same data length as that of the data sequence encoded by a now-commonly-performed coding method using the reverse ECC.

If an ECC parity bit sequence is calculated for the dummy symbol of the first pattern A+the run-length limited digital information sequence, an ECC parity bit sequence for the dummy symbol of the next pattern B+the run-length limited digital information sequence can be calculated easily as described below.

Suppose there is a data sequence composed of the dummy symbol of pattern A, the run-length limited digital information sequence (user data), and the ECC parity bit sequence [1] calculated for the dummy symbol and run-length limited digital information sequence as shown by reference symbol (a) of FIG. 5.

In this case, as shown by reference symbol (b) of FIG. 5, a data sequence is generated which is composed of the dummy symbol of pattern A+B obtained by exclusive-ORing the dummy symbol of pattern A with the dummy symbol of the next pattern B, a digital information sequence of all zeros having the same bit length as that of the run-length limited digital information sequence, and the ECC parity bit sequence [2] calculated for the dummy symbol of pattern A+B and digital information sequence of all zeros.

Then, the data sequence shown by reference symbol (a) of FIG. 5 is exclusive ORed with the data sequence shown by reference symbol (b) of FIG. 5, thereby generating a data sequence composed of the dummy symbol of pattern B, the run-length limited digital information sequence (user data), and the ECC parity bit sequence [1]+[2] calculated for the dummy symbol and run-length limited digital information sequence as shown by reference symbol (c) of FIG. 5. That is, the ECC parity bit sequence [1]+[2] for the dummy symbol of pattern B following pattern A+the run-length limited digital information sequence is generated easily.

Since the dummy symbol patterns A and B have been set, if the ECC parity bit sequence [2] for the dummy symbol of pattern A+B and digital information sequence of all zeros is calculated in advance, the dummy symbol can be changed easily to the dummy symbol of pattern B, when it is determined that the ECC parity bit sequence in using the dummy symbol of pattern A is not in a form satisfying the request of the recording and reproducing system.

Figure 6:
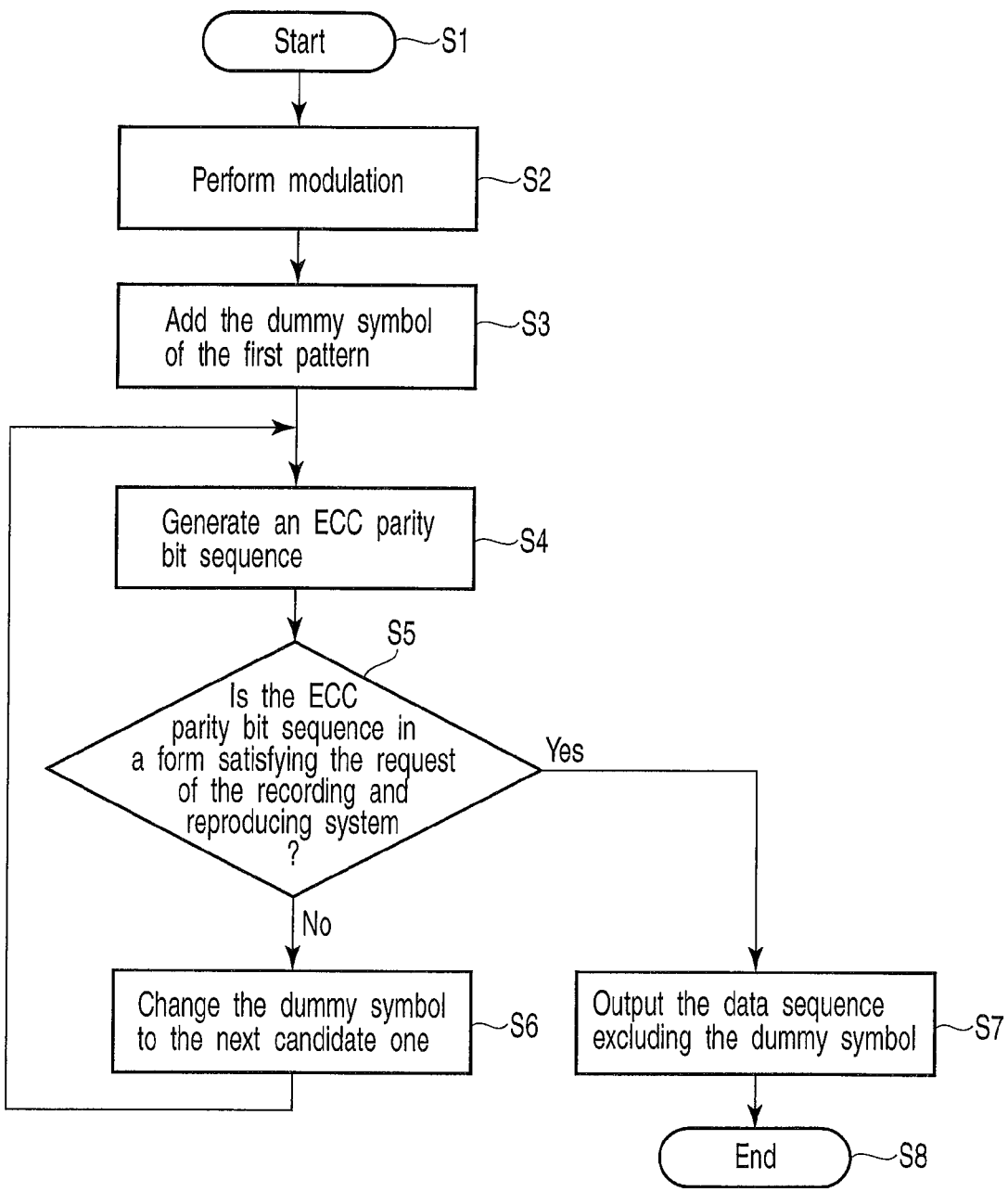
FIG. 6 is a flowchart to help explain the processing operation at the recording unit incorporated in the HDD of the embodiment.

FIG. 6 is a flowchart to help explain the main processing operation at the recording unit 15. The processing operation is started when a digital information sequence, user data, as shown by reference symbol (a) of FIG. 4 is supplied to the modulation unit 20 (step S1). Then, in step S2, the modulation unit 20 subjects the input digital information sequence to a modulation process of bringing the sequence into a form satisfying the request of the recording and reproducing system of the HDD 11, such as a run-length limited process of preventing zeros from running for more than a specific length as shown by reference symbol (b) of FIG. 4.

Thereafter, the dummy symbol adding unit 21 adds the dummy symbol of the first pattern A to the run-length limited digital information sequence in step S3 as shown by reference symbol (c) of FIG. 4. Then, in step S4, the encoding unit 22 calculates an ECC parity bit sequence on the basis of, for example, the RS code as shown by reference symbol (d) of FIG. 4 for the dummy-symbol-added run-length limited digital information sequence subjected to the run length limited process and adds the parity bit sequence to the information sequence.

Thereafter, in step S5, the determination control unit 23 determines whether or not the added ECC parity bit sequence is in a form satisfying the request of the recording and reproducing system of the HDD 11, such as a form that prevents zeros from running for more than a specific length. Then, if having determined that the ECC parity bit sequence is not in a form satisfying the request of the recording and reproducing system of the HDD 11 (NO), the determination control unit 23 changes the dummy symbol to the next candidate dummy symbol in step S6 and returns to the process in step S4.

If having determined that the ECC parity bit sequence is in a form satisfying the request of the recording and reproducing system of the HDD 11 (YES), the determination control unit 23 outputs the data sequence supplied from the encoding unit 22 excluding the dummy symbol (the run-length limited digital information sequence+the ECC parity bit sequence) in step S7 as shown by reference symbol (e) of FIG. 4 and ends the process (step S8).

Next, FIG. 7 shows an example of the reproducing unit 18. Specifically, when information is reproduced, the data sequence (the run-length limited digital information sequence+the ECC parity bit sequence) read from the hard disk 17 and supplied via the disk I/F 16 is supplied via an input terminal 25 to a dummy symbol adding unit 26. The dummy symbol adding unit 26 adds the dummy symbol of the first patter A to a preset position of the input data sequence.

Then, the data sequence (the dummy symbol of pattern A+the run-length limited digital information sequence+the ECC parity bit sequence) output from the dummy symbol adding unit 26 is supplied to a decoding unit 27. The decoding unit 27 subjects the dummy symbol of pattern A+the run-length limited digital information sequence to an error correction process on the basis of the ECC parity bit sequence included in the input data sequence.

Thereafter, the dummy symbol of pattern A+the run-length limited digital information sequence which have been error-corrected and output from the decoding unit 27 is input to a determination control unit 28. The determination control unit 28 determines from the error-corrected dummy symbol of pattern A+run-length limited digital information sequence whether the error correction process at the decoding unit 27 has been performed properly.

If having determined that the error correction process at the decoding unit 27 has been performed properly, the determination control unit 28 outputs to a demodulation unit 29 the run-length limited digital information sequence obtained by removing the dummy symbol from the data sequence supplied from the decoding unit 27. The demodulation unit 29 demodulates the input run-length limited digital information sequence, restores it to the original digital information sequence before the run length limited process, and outputs the original digital information sequence at an output terminal 30. The original digital information sequence is used at the host unit 12.

If having determined that the error correction process at the decoding unit 27 has not been performed properly, the determination control unit 28 determines that the pattern of the dummy symbol added at the dummy symbol adding unit 26 is wrong and requests the dummy symbol adding unit 26 to change the pattern of the dummy symbol. As a result, the dummy symbol adding unit 26 adds the dummy symbol of pattern B corresponding to the next order to the input data sequence. Hereinafter, a similar operation is repeated, changing the pattern of the dummy symbol, until the determination control unit 28 determines that the error correction process has been carried out properly.

Figure 8:
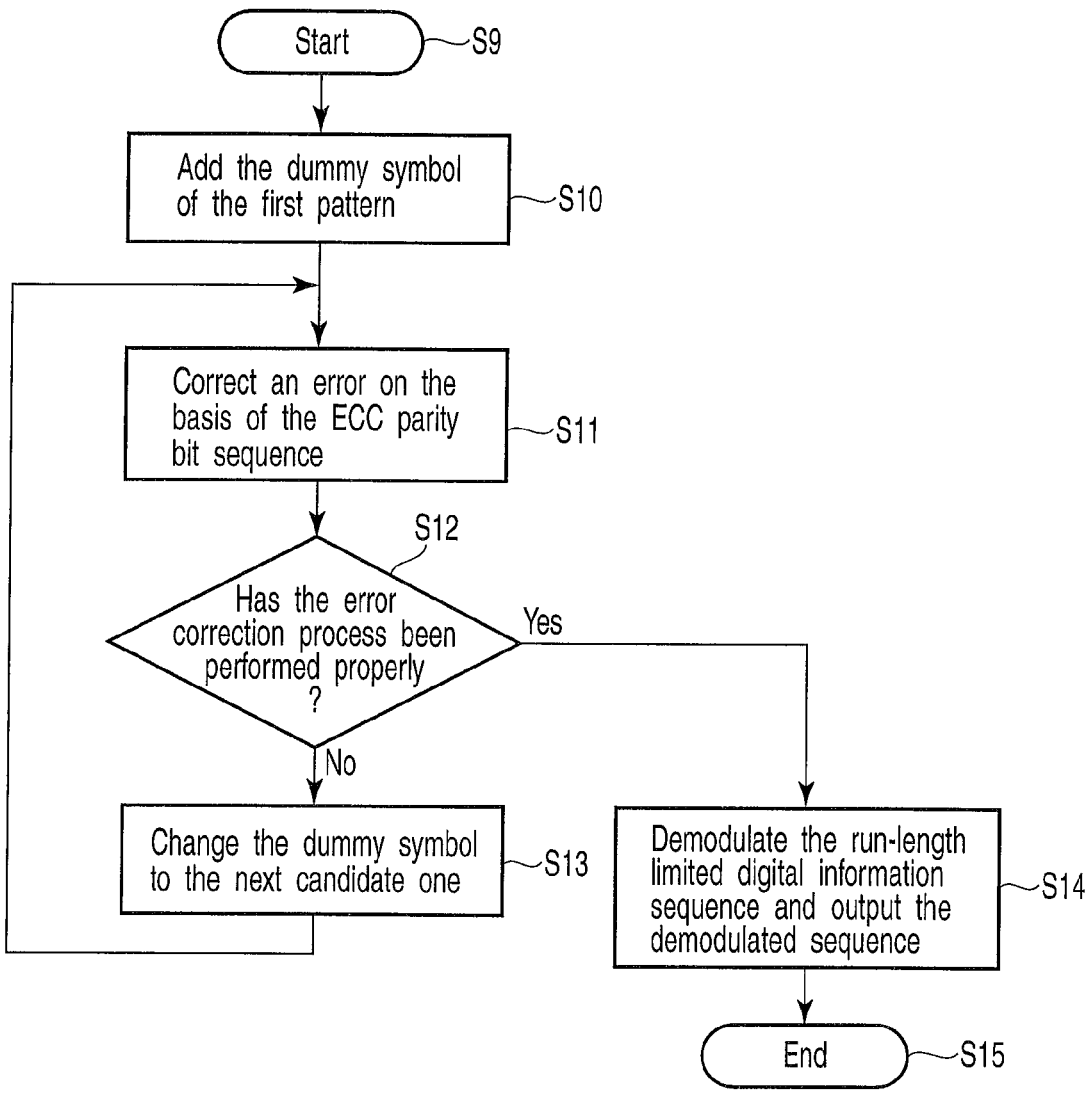
FIG. 8 is a flowchart to help explain the processing operation at the reproducing unit incorporated in the HDD of the embodiment.

FIG. 8 is a flowchart to help explain the main operation at the reproducing unit 18. The operation is started when a data sequence (the run-length limited digital information sequence+the ECC parity bit sequence) as shown by reference symbol (e) of FIG. 4 is supplied to the dummy symbol adding unit 26 (step S9). Then, in step S10, the dummy symbol adding unit 26 adds the dummy symbol of the first pattern A to a preset position of the input data sequence as shown by reference symbol (d) of FIG. 4.

Thereafter, in step S11, the decoding unit 27 subjects the dummy symbol of pattern A+the run-length limited digital information sequence to an error correction process on the basis of the ECC parity bit sequence included in the input data sequence (the dummy symbol of pattern A+the run-length limited digital information sequence+the ECC parity bit sequence) and outputs the error-corrected data sequence (the dummy symbol of pattern A+the run-length limited digital information sequence) as shown by reference symbol (c) of FIG. 4.

Next, in step S12, the determination control unit 28 determines from the input error-corrected data sequence (the dummy symbol of pattern A+the run-length limited digital information sequence) whether the error correction process at the decoding unit 27 has been performed properly. If having determined that the error correction process has not been performed properly (NO), the determination control unit 28 determines that the pattern of the dummy symbol added at the dummy symbol adding unit 26 is wrong and, in step S13, requests the dummy symbol adding unit 26 to change the pattern of the dummy symbol. As a result, the dummy symbol adding unit 26 adds the dummy symbol of pattern B corresponding to the next order to the input data sequence (the run-length limited digital information sequence+the ECC parity bit sequence) as shown by reference symbol (g) of FIG. 4.

Furthermore, in step S12, if having determined that the error correction process has been performed properly (YES), the determination control unit 28, in step S14, outputs to the demodulation unit 29 the run-length limited digital information sequence obtained by removing the dummy symbol from the data sequence supplied from the decoding unit 27 as shown in reference symbol (b) of FIG. 4. Then, the demodulation unit 29 demodulates the input run-length limited digital information sequence, restores it to the original digital information sequence before the run length limited process, and outputs the original digital information sequence at an output terminal 30, which completes the process (step S15).

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An error correcting apparatus comprising:
   a generating unit configured to generate an error correction parity bit sequence for a data sequence to which a dummy symbol of a predetermined pattern has been added, the dummy symbol being added to a specific position of digital information sequence that has been subjected to a modulation process of converting into a form satisfying a request of a reproducing system; and
   a control unit configured to generate an error correction parity bit sequence by adding a dummy symbol of another predetermined pattern to the modulated digital information sequence, if a parity bit sequence generated at the generating unit does not correspond to the form satisfying the request of the reproducing system.

2. The error correcting apparatus according to claim 1, wherein the control unit is configured to output the modulated digital information sequence excluding the dummy symbol and the parity bit sequence in such a manner that the information sequence and parity bit sequence correspond to each other, if the parity bit sequence generated at the generating section corresponds to the form satisfying the request of the reproducing system.

3. The error correcting apparatus according to claim 1, wherein the control unit is configured to continue to change the pattern of a dummy symbol added to the modulated digital information sequence in a preset order until the parity bit sequence generated at the generating unit corresponds to the form satisfying the request of the reproducing system.

4. The error correcting apparatus according to claim 1, wherein the control unit is configured to exclusive-OR a first parity bit sequence generated by adding a dummy symbol of a first pattern to the modulated digital information sequence with a second parity bit sequence generated by adding a dummy symbol of a second pattern differing from the first pattern to a digital information sequence which has as many bits as correspond to the modulated digital information sequence, the bits all being set to zero, thereby generating a parity bit sequence for the modulated digital information sequence to which the dummy symbol of the second pattern has been added.

5. The error correcting apparatus according to claim 1, wherein the generating unit is configured to add the dummy symbol to one of the head, middle, and end of the modulated digital information sequence.

6. The error correcting apparatus according to claim 2, further comprising a reproducing unit configured to record and reproduce the modulated digital information sequence and parity bit sequence output from the control unit onto and from an information recording medium.

7. An error correcting apparatus comprising:
   a processing unit configured to enable input of a digital information sequence subjected to a modulation process of converting into a form satisfying a request of a reproducing system and an error correction parity bit sequence corresponding to the information sequence, and to execute error correction processing based on the parity bit sequence with respect to a data sequence to which a dummy symbol of a predetermined pattern has been added, the dummy symbol being added to a specific position of digital information sequence that has been subjected to the modulation process; and
   a control unit configured to generate an error correction parity bit sequence by adding a dummy symbol of another predetermined pattern to the modulated digital information sequence, if a parity bit sequence generated at the generating unit does not correspond to the form satisfying the request of the reproducing system.

8. The error correcting apparatus according to claim 7, wherein the control unit performs demodulating processing with respect to the digital information sequence subjected to the modulation processing to reproduce the original digital information sequence, when the processing unit fails to properly perform the error correction processing.

9. The error correcting apparatus according to claim 7, wherein the control unit is configured to change the pattern of the dummy symbol added to the digital information sequence subjected to the modulation process, until the processing unit properly performs the error correction processing.

10. An error correcting method comprising:

generating an error correction parity bit sequence for a data sequence to which a dummy symbol of a predetermined pattern has been added, the dummy symbol being added to a specific position of digital information sequence that has been subjected to a modulation process of converting into a form satisfying a request of a reproducing system; and generating an error correction parity bit sequence by adding a dummy symbol of a predetermined other pattern to the modulated digital information sequence, if a generated parity bit sequence does not correspond to the form satisfying the request of the reproducing system.

11. The error correcting method according to claim 10, further comprising:

outputting the modulated digital information sequence excluding the dummy symbol and the parity bit sequence in such a manner that the information sequence and parity bit sequence correspond to each other, if the generated parity bit sequence corresponds to the form satisfying the request of the reproducing system.

* * * * *